United States Patent [19]

Ishikawa

[11] Patent Number: 4,487,494

[45] Date of Patent: Dec. 11, 1984

[54] AUTOMATIC FOCUSING APPARATUS USING ULTRASONIC WAVE

[75] Inventor: Katsuji Ishikawa, Higashiosaka, Japan

[73] Assignee: West Electric Co., Ltd., Osaka, Japan

[21] Appl. No.: 494,026

[22] Filed: May 12, 1983

[30] Foreign Application Priority Data

May 14, 1982 [JP] Japan .................................. 57-81965

[51] Int. Cl.³ .............................................. G03B 3/10
[52] U.S. Cl. ................................................... 354/401
[58] Field of Search ................................ 354/400, 401

[56] References Cited

U.S. PATENT DOCUMENTS 4,309,098 1/1982 Shenk .................................. 354/401
4,336,987 6/1982 Shenk .................................. 354/401

Primary Examiner—Russell E. Adams
Attorney, Agent, or Firm—Stevens, Davis, Miller & Mosher

[57] ABSTRACT

An automatic focusing apparatus using an ultrasonic wave wherein the ultrasonic wave is used to measure the distance to an object by plural times, a plurality of distance data obtained through the plurality of distance measuring operations are compared to each other, each of the plurality of distance data is checked for its effectiveness on the basis of the result of the comparison to provide a single of highly trustworthy information indicative of the distance to the object, and the information is used for automatic focal point adjustment of a taking lens.

6 Claims, 3 Drawing Figures

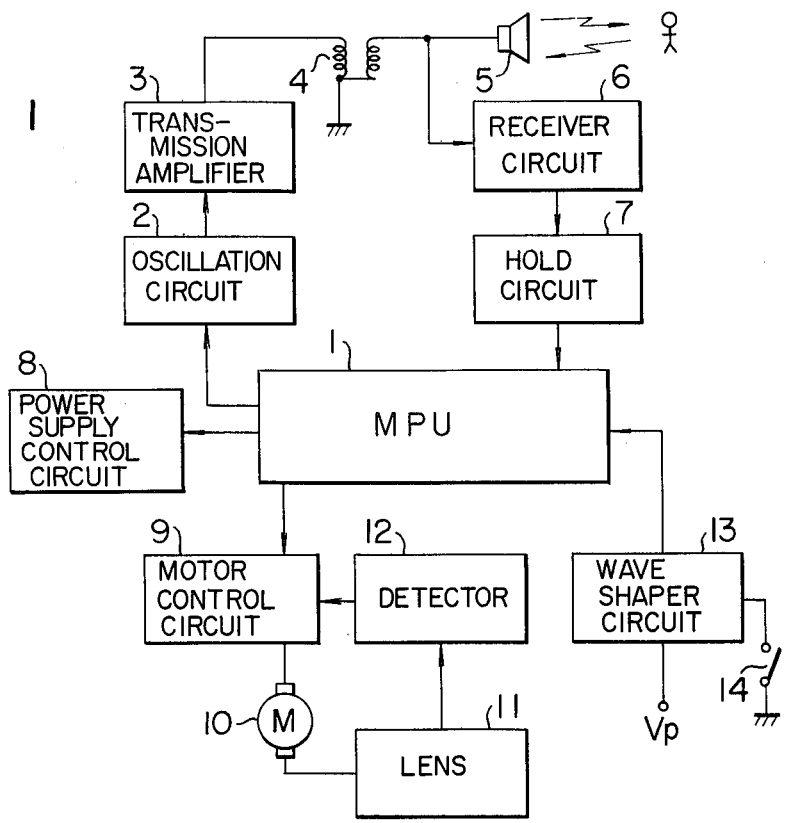
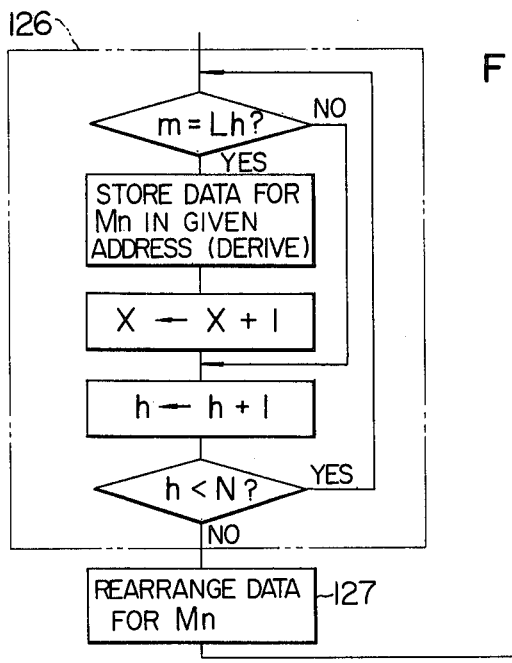
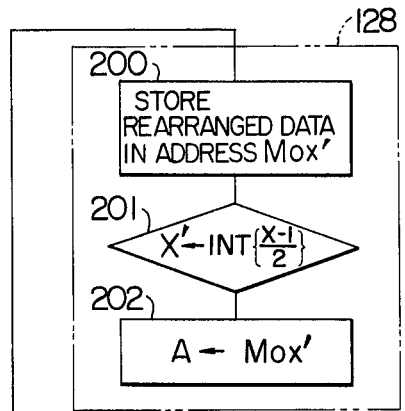
FIG. 1
FIG. 3

4,487,494

AUTOMATIC FOCUSING APPARATUS USING ULTRASONIC WAVE

BACKGROUND OF THE INVENTION

In recent years, a photographing camera unit has been available wherein an ultrasonic wave is transmitted to an object to be photographed for distance measurement and on the basis of a result of the distance measurement, a taking lens is rotated for its axial movement. When using the ultrasonic wave, however, an echo level changes drastically even for an object being still at a fixed distance under the influence of such factors as flow and temperature of atmospheric air, and a distance measuring signal is difficult to detect, resulting in erroneous distance measurement dependent on atmospheric air conditions. In addition, errors in distance detection due to noises tend to occur and acurate focal point adjustment will be difficult.

Where the distance to a target object varies, on the other hand, the echo level returned from the object varies with the distance in such a manner that when the object is at a close distance, the echo level becomes large and when at a remote distance, the echo level becomes small, thus giving rise to inconvenience that the distance detection is sometimes impossible for an object being at a remote distance.

For these reasons, highly accurate distance measurement can not be expected through distance measurement by one time. Further, in the event that, even with an object being distance within a focal point adjustable range, an echo signal can not be detected under the influence of an atmospheric air condition, an erroneous operation results wherein the taking lens is rotated for its axial movement corresponding to an infinite distance.

SUMMARY OF THE INVENTION

An object of the present invention is to provide an automatic focusing apparatus using an ultrasonic wave which can perform a highly accurate focal point adjustment.

To accomplish the above object, according to the present invention, an automatic focusing apparatus comprises a microprocessor unit which executes a step of performing distance measurement based on the ultrasonic wave by plural times and comparing a plurality of distance measurement data obtained from the distance measurement in such a manner that each of the plural data is compared with each of the remaining data, and a step of selecting effective distance measurement data from results of the comparison and deriving a single of highly trustworthy distance measurement information from the effective distance measurement data.

BRIEF DESCRIPTION OF THE DRAWINGS

FIG. 1 is a block diagram of an automatic focusing apparatus using an ultrasonic wave embodying the present invention.

FIG. 3 is a fragmentary flow chart for explaining details of steps in the flow chart of FIG. 2.

DESCRIPTION OF THE PREFERRED EMBODIMENT

Figure 2:
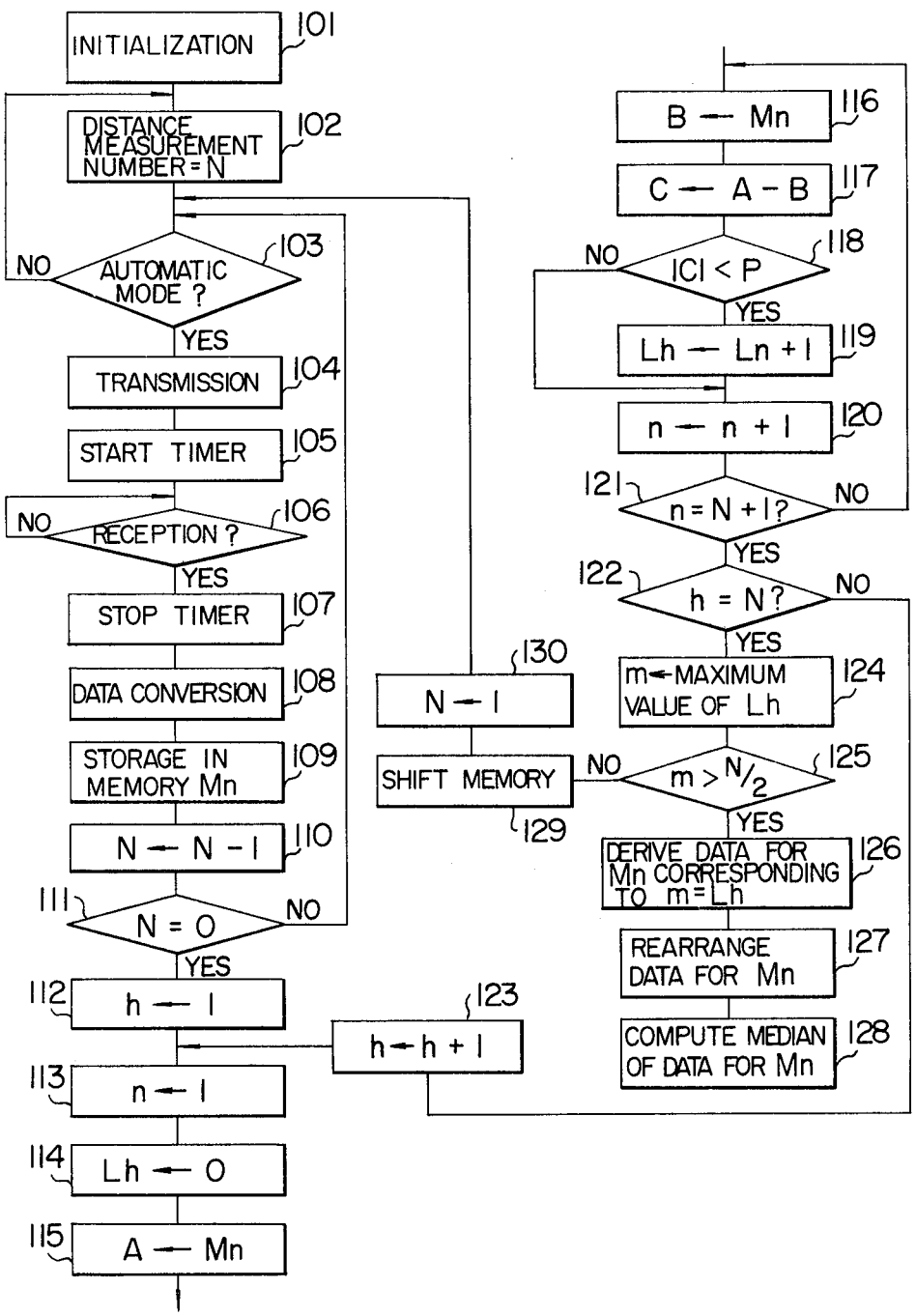
FIG. 2 a flow chart for explaining the operation of the apparatus shown in FIG. 1.

In general, an automatic focusing apparatus using an ultrasonic wave according to the present invention performs distance measurement by plural times, selects a plurality of effective data from a plurality of distance measurement data, and derives a single of highly trustworthy distance information from the effective data, thus accomplishing an automatic focal point adjustment of a taking lens. The invention will be described by way of example with reference to the accompanying drawings.

FIG. 1 shows, in block form, a preferred embodiment of an automatic focusing apparatus using an ultrasonic wave according to the present invention. The apparatus comprises a microprocessor unit (hereinafter referred to as MPU) 1 adapted to control the apparatus, an oscillation circuit 2 controllable for its oscillation by the MPU 1, a transmission amplifier 3, a signal converting transformer 4, an ultrasonic wave transmitter/receiver 5 which generates an ultrasonic wave and receives an echo from an object, a receiver circuit 6, a hold circuit 7 for received signals, a power supply control circuit 8 controllable by the MPU 1, a motor control circuit 9, a motor 10, a lens (taking lens) 11, a detector 12 for detecting a rotary position of the lens 11, a wave shaper circuit 13 for external signals, and a switch 14 for selecting either automatic or manual rotation of the lens 11.

The operation of the apparatus will be described with reference to a flow chart as shown in FIG. 2. When power supply is turned on, the MPU 1 is initialized in a step 101, and in a succeeding step 102, the number of distance measuring operations is set to N.

Assuming that the limit of the distance measurement based on the ultrasonic wave is 10 m, the number of the distance measuring operations is determined in consideration of the fact that about 60 m sec elapses between transmission of the ultrasonic wave and reception of an echo from an object at a distance of 10 m, that the object moves, and that it takes about 0.3 to 0.6 sec following the distance measurement for the lens to reach a focal point through rotation for its axial movement.

Subsequently, it is judged in a step 103 as to whether an automatic or manual mode is selected by the switch 14. If the manual mode is selected, the procedure returns to the step 102 and again proceeds to the step 103 by way of the step 102.

If, on the other hand, the automatic mode is selected by the switch 14, peripheral units and circuits (not shown) are supplied with power via the power supply control circuit 8 and they are activated.

Subsequently, in a step 104, the ultrasonic wave is transmitted to the object. In an application in which the present apparatus is used with a video camera, the transmission of ultrasonic wave to the object is effected by applying as a start pulse a vertical synchronizing signal (VP) of the video camera to the oscillation circuit 2 to operate the same, emplifying an oscillator output at the transmission amplifier 3, and operating the ultrasonic transmitter/receiver 5 with a boosted voltage delivered from the signal converting transformer 4. While the ultrasonic wave is transmitted to the object, a timer, which counts up sequentially, is started in a step 105 and subsequently, it is judged in a step 106 as to whether an echo from the object is received by the transmitter/receiver 5. A received signal is fed to the receiver circuit 6 and is then held at the signal hold circuit 7.

In order to exclude holding of a signal during the transmission, the signal hold circuit 7 is deactivated by receiving a reset signal, and slightly after the initiation of the transmission in the step 104, for example, at the termination of a 400 μsec period, the oscillation circuit 2 is caused to stop operating and the hold circuit 7 is released from resetting to be brought into activation in the step 105. Subsequently, when the timer is stopped upon reception of a signal from the object in a step 107, data of the timer is converted into data corresponding to one of points dividing an effective rotation angle of the lens in a step 108, and the converted data is inputted as distance measurement data into an address of a memory in a step 109.

In succeeding steps 110 and 111, the number of distance measuring operations is checked so that N distance measuring operations are carried out through the steps 103 to 109 until N =0 is established following decrement of the number N by one each time one operation has been completed, and the thus obtained data are sequentially inputted into the memory.

The inputted data are subjected to arithmetic operations in a step 112 and following steps. It is now assumed that the number of distance measuring operations is 5 and distance measurement data as shown in Table 1 are obtained.

TABLE 1

| $M_n$ | 1 | 2 | 3 | 4 | 5 |
|---|---|---|---|---|---|
| Data | 15 | 20 | 22 | 17 | 12 |

Concurrently with the initiation of the arithmetic operation, variables h and n for designating addresses in a memory and a variable $L_h$ for designating addresses in a memory for storage of the arithmetic operation results are first set to "1", "1" and "0", respectively, in steps 112, 113 and 114, respectively. In a succeeding step 115, distance measurement data of 15 obtained in the first measuring operation $M_1$ is then derived as A and in a succeeding step 116, the same data (15) is derived as B. Thereafter, in a step 117, A−B is computed and derived as C. Then, it is judged in a step 118 as to whether the data C falls within a predetermined lens drive point number P.

The lens drive point number is determined dependent on lens performance and a time period for each distance measuring operation. It is now assumed that the P is set to 4.

Since, in this example, C=A−B=0 (zero), indicating that c is less than 4, the procedure proceeds to a step 119 where the previous value of variable $L_1$ ($L_h$ for $M_1$), "0", is added with "1" to change to 1=0+1 and in a succeeding step 120, the previous value of variable n, "1", is added with "1" to change to 2=1+1. Then, it is judged in a step 121 as to whether the thus updated n equals a value of N plus 1 (one). Since in this example the N is 5, it is judged as to whether the n is 6, indicating that n=2≠6. Consequently, the procedure returns to the step 116 where distance measurement data of 20 for $M_2$ is derived as B. In the step 117, C is then computed using this B and the distance measurement data of 15 for $M_1$ substituting for A to obtain 15−20=−5. This value of C is compared with the predetermined P in the succeeding step 118.

Since in this arithmetic operation $|C|=|-5|>4$ stands, the procedure does not proceed from the step 118 to the succeeding step 119 but jumps to the step 120. Then, in the step 120, the n changes to 2+1=3. The procedure thus proceeds to the step 121 where n=3≠6 is decided and again returns to the step 116. The arithmetic operation through the steps 116 to 121 is repeated until n=N+1=6 is established.

When n=N+1=6 is reached, the procedure proceeds to a step 122 where it is judged as to whether the h equals the N which is 5. At present, since the arithetic operation of data associated with addresses for h=1 corresponding to $M_1$ has been completed, h=1 is unequal to N=5, the procedure proceeds to a step 123 where the h is set to 1+1=2.

Subsequently, the procedure again proceeds to the step 113 where the n is set to 1 (one), $L_2$ ($L_h$ for $M_2$) is set to 0 (zero) in the step 114, and distance measurement data of 20 for $M_2$ is derived as A in the step 115. And, in the step 116, distance measurement data of 15 for $M_1$ is derived as B. Thereafter, a similar arithmetic operation is repeated for the distance measurement data of 20 obtained in the second distance measuring operation through the steps 116 to 121. Thus, as the number of distance measuring operation increases, the h is sequentially increased in the step 122 until h=N=5 is held, producing data as listed in Table 2.

TABLE 2

| h | n | A | B | C | $L_1$ | $L_2$ | $L_3$ | $L_4$ | $L_5$ |
|---|---|---|---|---|---|---|---|---|---|
| 1 | 1 | 15 | 15 | 0 | 1 | | | | |
| | 2 | 15 | 20 | −5 | | | | | |
| | 3 | 15 | 22 | −7 | | | | | |
| | 4 | 15 | 17 | −2 | 2 | | | | |
| | 5 | 15 | 12 | 3 | 3 | | | | |
| | 6 | | | | | | | | |
| 2 | 1 | 20 | 15 | 5 | | | | | |
| | 2 | 20 | 20 | 0 | | 1 | | | |
| | 3 | 20 | 22 | −2 | | 2 | | | |
| | 4 | 20 | 17 | 3 | | 3 | | | |
| | 5 | 20 | 12 | 8 | | | | | |
| | 6 | | | | | | | | |
| 3 | 1 | 22 | 15 | 7 | | | | | |
| | 2 | 22 | 20 | 2 | | | 1 | | |
| | 3 | 22 | 22 | 0 | | | 2 | | |
| | 4 | 22 | 17 | 5 | | | | | |
| | 5 | 22 | 12 | 10 | | | | | |
| | 6 | | | | | | | | |
| 4 | 1 | 17 | 15 | 2 | | | | 1 | |
| | 2 | 17 | 20 | −3 | | | | 2 | |
| | 3 | 17 | 22 | −5 | | | | | |
| | 4 | 17 | 17 | 0 | | | | 3 | |
| | 5 | 17 | 12 | 5 | | | | | |
| | 6 | | | | | | | | |
| 5 | 1 | 12 | 15 | −3 | | | | | 1 |
| | 2 | 12 | 20 | −8 | | | | | |
| | 3 | 12 | 22 | −10 | | | | | |
| | 4 | 12 | 17 | −5 | 17 | −5 | | | |
| | 5 | 12 | 12 | 0 | | | | | 2 |
| | 6 | | | | | | | | |

Subsequently, in a step 124, a maximum value m of the $L_h$ in the thus obtained data is derived. In this example, the maximum value m is 3.

In a step 125, it is then judged as to whether m=3 is larger than N/2. Since at present m=3>5/2=2.5 stands, the procedure proceeds to a succeding step 126 where distance measurement data of 15, 20 and 17 are derived which are obtained in the distance measuring operations associated with the $L_h$ containing the maximum value m which is 3. In a succeding step 127, the distance measurement data are rearranged in the order of their magnitude, that is, in sequence of 15, 17 and 20. Thereafter, in a step 128, a median of the three data which is 17 is derived as distance measurement data.

For determination of the median of the data in the step 128, steps as exemplified in FIG. 3 are employed in this embodiment.

More particularly, in a step 200, the data selected in the preceding step 126 and rearranged in an orderly manner in the preceding step 127 are stored in a given memory $M_{ox'}$ as shown in Table 3.

TABLE 3

| $M_{00}$ | $M_{01}$ | $M_{02}$ |
|---|---|---|
| 15 | 17 | 20 |

An address ox' in this memory is set in a step 201, and data corresponding to this address is derived as Y.

For address setting, a variable X is used which is determined dependent on contents of a counter which counts the number of data derived in the preceding step 126. Since in this example three data are derived, a variable X' is determined on the basis of X=3 in the step 201.

The determination of the variable X' in the step 201 involves subtraction of 1 (one) from the variable X, division of a resultant difference by 2, and production of an integer from a resultant quotient by rounding off a fraction thereof. Thus, in this example, by substitution of X=3, (3−1)/2=1 results, determining a value of the variable X' to be 1.

It follows that because of X'=1, $M_{oX'} = M_{01}$ is determined as data A in a step 202 and data of 17 corresponding to $M_{01}$ in Table 3 is derived.

For example, where the variable X is 4 indicating that the number of data derived in the step 126 is 4, a fraction of (4−1)/2=1.5 is rounded off in the step 201 to determine the variable X' to be 1 (one) so that data stored in an address $M_{01}$ is selected from four data corresponding to addresses $M_{00}$ to $M_{03}$ and derived in the succeeding step 202.

In other words, this embodiment is so constructed that when the number of data derived in the step 126 is odd, a true median is derived in the step 128 whereas when the number of data is even, one of two medial data which is smaller than the other is derived. Thus, if a fraction is rounded up for the production of an integer in the step 201, the same result as that obtained by round-off can be obtained when the number of data derived is odd whereas a resultant data next to and larger than that for the odd number is selected when the number of data derived is even, having no substantial influence upon the production of integer.

As far as binary processing by means of a microprocessor unit is concerned, it will be appreciated that round-off is easier to process than round-up as well known in the art and hence, in the present embodiment, the round-off processing is preferably employed.

The substration of "1" from the variable X in the step 201 is employed because the address of the memory $M_{ox'}$ for storage of data in the step 200 starts from 0 (zero). Accordingly, the aforementioned subtraction is a measure adapted only for the derivation of a median of the stored data, and different methods may obviously be employed for setting the addresses.

Meanwhile, when it is assumed that the maximum value m obtained in the preceding step 124 is 2, m=2<5/2=2.5 is held for 5 distance measuring operations, indicating that highly trustworthy data can not be obtained through these distance measuring operations, and the procedure then proceeds to a step 129 where five distance measurement data stored in the memory are sequentially shifted as shown in Table 5, that is, data associated with $M_1$ to one associated with $M_2$ and data associated with $M_2$ to one associated with $M_3$. Subsequently, the number of distance measuring operations is reset to 1 (one) in a step 130 and the procedure returns to the step 103. Then, new data associated with $M_1$ is inputted and a similar arithmetic operation is repeated through the steps 103 to 125 until m>N/2 is established and the procedure proceeds to the step 126.

TABLE 4

| $M_n$ | 1 | 2 | 3 | 4 | 5 | 6 |
|---|---|---|---|---|---|---|
| Original data | 15 | 20 | 22 | 17 | 12 | |
| Shifted data | | 15 | 20 | 22 | 17 | 12 |

The thus obtained data is fed to the motor control circuit 9 and cooperates with the lens position detection by the lens position detecting circuit 12 to control the rotation of the motor 10, as well known in the art.

As has been described, in the automatic focusing apparatus using an ultrasonic wave according to the present invention, the distance measuring operation is performed by plural times, and the distance measurement data is eventually checked for its effectiveness in terms of reduction of irregularity so that for large irregularity, it is judged that erroneous data is involved which is due to external noise and variation in received signal level to cause the distance measuring operation again, thereby constantly assuring highly accurate distance measurement and stable and highly accurate focal point adjustment.

I claim:

1. An automatic focusing apparatus using an ultrasonic wave wherein the ultrasonic wave generated from an ultrasonic wave generator is transmitted to an object, the distance to the object is measured by receiving an echo therefrom, and a motor is driven to rotate on the basis of distance measurement data so as to axially move a lens for focal point adjustment, said apparatus comprising:

a microprocessor unit comprising first means for performing a measurement of a distance to the object by plural times and storing a plurality of distance measurement data, second means for comprising each of the plurality of distance measurement data with each remaining data, third means for determining whether resultant data of the comparison is effective, and fourth means for employing data determined by said third means to be effective as distance measurement data for focal point adjustment of said lens.

2. An automatic focusing apparatus using an ultrasonic wave according to claim 1 wherein said second means comprises a fifth means for computing a difference between a first particular distance measurement data stored in said first means and second particular distance measurement data inclusive of the first particular data, and a sixth means for performing the fifth means in respect of each of said plurality of distance measurement data.

3. An automatic focusing apparatus using an ultrasonic wave according to claim 1 wherein said third means comprises a seventh means for comparing an absolute value of a difference between a plurality of data obtained in said fifth and sixth means with a predetermined number and determining a magnitude relationship between the absolute value and the predetermined number, an eighth means for storing the number of comparisons in the seventh means in which the absolute value is determined to be smaller than the predetermined number during each comparison, and a ninth means for deriving and storing distance measurement data corresponding to a maximum value of the number of comparisons obtained in the eighth means.

4. An automatic focusing apparatus using an ultrasonic wave according to claim 1 wherein said fourth means comprises a tenth means for computing a median from the data derived in the ninth means.

5. An automatic focusing apparatus using an ultrasonic wave according to claim 4 wherein said tenth means comprises an eleventh means for storing the number of data derived in the ninth means, a twelfth means for setting addresses for the storage in the ninth means in accordance with the number obtained in the eleventh means, and a thirteenth means for deriving from the distance measurement data stored in the ninth means a distance measurement data corresponding to an address set in the twelfth means.

6. An automatic focusing control method using an ultrasonic wave comprising transmitting an ultrasonic wave generated from an ultrasonic wave generator to an object, measuring a distance to the object by receiving an echo therefrom, processing the measurement data by using a microprocessor to obtain distance measurement data, and driving a motor to rotate it based on distance measurement data so as to axially move a lens for focal point adjustment, using said microprocessor to execute steps, including executing a first step of performing a measurement of a distance to the object by plural times and storing a plurality of distance measurement data, a second step of comparing each of the plurality of distance measurement data with each of the remaining data, a third step of determining whether resultant data of the comparison is effective, and a fourth step of deriving effective data determined in the third step as distance measurement data for focal point adjustment of said lens.

* * * * *